(12) United States Patent
Antesberger et al.

(10) Patent No.: US 11,833,604 B2
(45) Date of Patent: Dec. 5, 2023

(54) METHOD OF PREPARING AN ELECTRODE FOR USE IN FORMING A HONEYCOMB EXTRUSION DIE

(71) Applicant: CORNING INCORPORATED, Corning, NY (US)

(72) Inventors: Timothy Eugene Antesberger, Vestal, NY (US); Dana Craig Bookbinder, Corning, NY (US); Dana Eugene Coots, Tioga, PA (US); Seyed Amir Farzadfar, Corning, NY (US); Dominick John Forenz, Hammondsport, NY (US); Ryan Joseph Grohsmeyer, Addison, NY (US); Mark Lee Humphrey, Burdett, NY (US); Zakariya Radwan Khayat, State College, PA (US); Kenneth Richard Miller, Addison, NY (US); Richard Curwood Peterson, Elmira Heights, NY (US); John Charles Rector, Beaver Dams, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 17/613,822

(22) PCT Filed: May 21, 2020

(86) PCT No.: PCT/US2020/033934
§ 371 (c)(1),
(2) Date: Nov. 23, 2021

(87) PCT Pub. No.: WO2020/237012
PCT Pub. Date: Nov. 26, 2020

(65) Prior Publication Data
US 2022/0234108 A1    Jul. 28, 2022

Related U.S. Application Data

(60) Provisional application No. 62/851,973, filed on May 23, 2019.

(51) Int. Cl.
*B23H 7/24* (2006.01)
*B33Y 10/00* (2015.01)
(Continued)

(52) U.S. Cl.
CPC ............... *B23H 7/24* (2013.01); *B22F 10/28* (2021.01); *B22F 10/66* (2021.01); *B28B 3/269* (2013.01);
(Continued)

(58) Field of Classification Search
CPC .......... B22F 10/28; B22F 1/052; B22F 10/62; B22F 2301/10; B22F 2301/20;
(Continued)

(56) References Cited

U.S. PATENT DOCUMENTS 3,929,475 A    12/1975 Ingersoll
3,929,476 A    12/1975 Kirby, Jr. et al.
(Continued)

FOREIGN PATENT DOCUMENTS

DE    102006054347 A1 *   5/2008   ............ B22F 3/1055
DE    102006054347 A1      5/2008
(Continued)

OTHER PUBLICATIONS

International Search Report and Written Opinion of the International Searching Authority; PCT/US2020/033934; dated Oct. 26, 2020; 20 pages; European Patent Office.

*Primary Examiner* — Rebecca Janssen
(74) *Attorney, Agent, or Firm* — Joseph M. Homa

(57) ABSTRACT

Methods for forming an electrode for use in forming a honeycomb extrusion die. The method includes forming, by
(Continued)

means of an additive manufacturing process, an electrode includes a base having a web extending from the base. The web defines a matrix of cellular openings. The method further includes forming a secondary electrode having a plurality of pins. The plurality of pins are shaped and arranged so as to mate with the matrix of cellular openings defined by the web of the electrode. The method further includes machining the electrode using the secondary electrode to smooth surfaces of the electrode formed by the additive manufacturing process.

17 Claims, 13 Drawing Sheets

(51) Int. Cl.
| | | |
|---|---|---|
| *B22F 10/28* | (2021.01) | |
| *B22F 10/36* | (2021.01) | |
| *B22F 10/38* | (2021.01) | |
| *B33Y 80/00* | (2015.01) | |
| *B29C 48/30* | (2019.01) | |
| *B29C 48/32* | (2019.01) | |
| *B33Y 40/20* | (2020.01) | |
| *B28B 3/26* | (2006.01) | |
| *B22F 10/66* | (2021.01) | |
| *B22F 10/62* | (2021.01) | |
| *B22F 10/25* | (2021.01) | |

(52) U.S. Cl.
CPC .......... *B29C 48/3001* (2019.02); *B29C 48/32* (2019.02); *B33Y 10/00* (2014.12); *B33Y 40/20* (2020.01); *B33Y 80/00* (2014.12); *B22F 10/25* (2021.01); *B22F 10/36* (2021.01); *B22F 10/38* (2021.01); *B22F 10/62* (2021.01); *B22F 2301/10* (2013.01); *B22F 2301/20* (2013.01); *B22F 2304/10* (2013.01)

(58) Field of Classification Search
CPC . B22F 2304/10; B28B 3/269; B29C 48/3001; B29C 48/32; B33Y 10/00; B33Y 40/20; B33Y 80/00
See application file for complete search history.

(56) References Cited

U.S. PATENT DOCUMENTS

| | | | |
|---|---|---|---|
| 4,373,127 | A | 2/1983 | Haskett et al. |
| 5,889,220 | A | 3/1999 | Akiyoshi et al. |
| 7,618,514 | B2 | 11/2009 | Marszal et al. |
| 9,120,168 | B2 | 9/2015 | Nagae et al. |
| 10,124,408 | B2 | 11/2018 | Kenney et al. |
| 2011/0206896 | A1 | 8/2011 | Humphrey et al. |
| 2015/0014281 | A1 | 1/2015 | Trimmer et al. |
| 2017/0120359 | A1 | 5/2017 | Carter et al. |
| 2017/0266743 | A1 * | 9/2017 | Forenz .................... B23H 3/04 |

FOREIGN PATENT DOCUMENTS

| | | | | |
|---|---|---|---|---|
| DE | 102017006205 A1 * | 1/2019 | | ............. B22F 10/20 |
| JP | 2008-073783 A | 4/2008 | | |
| JP | 2008073783 A | * | 4/2008 | |
| JP | 2018077945 A | * | 5/2018 | |
| WO | 2007/133258 A2 | 11/2007 | | |
| WO | WO-2007133258 A2 * | 11/2007 | | ............ B22F 3/1055 |
| WO | 2014/160695 A1 | 10/2014 | | |
| WO | 2015/010802 A1 | 1/2015 | | |
| WO | 2015/146694 A1 | 10/2015 | | |
| WO | WO-2019025471 A1 * | 2/2019 | | ............. B22F 3/008 |

\* cited by examiner

METHOD OF PREPARING AN ELECTRODE FOR USE IN FORMING A HONEYCOMB EXTRUSION DIE

CROSS REFERENCE TO RELATED APPLICATIONS

This is a national stage application under 35 U.S.C. § 371 of International Application No. PCT/US2020/033934, filed on May 21, 2020 which claims the benefit of priority under 35 U.S.C. § 119 of U.S. Provisional Application No. 62/851,973 filed on May 23, 2019, the content of which is incorporated herein by reference in its entirety.

FIELD

Embodiments described herein generally relate to methods for forming electrodes and electrodes so formed. Specifically, embodiments described herein relate to methods for preparing an electrode that is used to form an extrusion die having a honeycomb pattern.

BACKGROUND

Features of some honeycomb extrusion dies are formed using wire electrical discharge machining (wire EDM). However, wire EDM may be impractical or unsuitable for forming honeycomb extrusion dies with certain patterns that are not conducive to formation by the linear wires used. Plunge electrical discharge machining (plunge EDM) and electrochemical machining (ECM) are alternate processes that can be used to form extrusion dies, including honeycomb extrusion dies not conducive to manufacture by wire EDM. Plunge EDM and ECM require the use of a specially configured electrode that is shaped to provide the extrusion die with the desired pattern. As a result, forming an electrode for use in plunge EDM or ECM may require additional time, materials, and cost.

Accordingly, there is a need in the art for a method for forming electrodes that can be used to produce honeycomb extrusion dies having varied geometries rapidly and with reduced expense.

BRIEF SUMMARY OF THE INVENTION

In a first aspect, a method for additively manufacturing a copper-tungsten electrode includes forming an electrode as a series of layers, wherein each layer is formed by depositing a layer of powder on a manufacturing platform or a previous layer in the series, wherein the layer of powder comprises a tungsten powder and a copper powder, and fusing the layer of powder using a laser to apply a laser energy of about 1 to about 10 J/mm2 to the layer of powder, and wherein the electrode is comprised of an interconnected network of tungsten infiltrated by copper formed by the series of layers fused together.

In a second aspect according to the preceding paragraph, the electrode can have a relative density of at least about 75%.

In a third aspect according to either of the preceding paragraphs, the electrode can have a relative density of at least about 90%.

In a fourth aspect according to any of the preceding paragraphs, each of the tungsten powder and the copper powder can have a particle size distribution of about 15 μm to about 55 μm.

In a fifth aspect according to any of the preceding paragraphs, each of the tungsten powder and the copper powder can have a particle size distribution of about 25 μm or less.

In a sixth aspect according to any of the preceding paragraphs, the tungsten powder can be present in the layer of powder in an amount of about 70 wt. % to about 90 wt. %.

In a seventh aspect according to any of the preceding paragraphs, the tungsten powder can be present in the layer of powder in an amount of 75 wt. % and the copper powder can be present in an amount of 25 wt. %.

In an eighth aspect according to any of the preceding paragraphs, depositing the layer of powder can include depositing one of the tungsten powder or the copper powder, and subsequently depositing the other of the tungsten powder or the copper powder.

In a ninth aspect according to any of the preceding paragraphs, depositing the layer of powder can include depositing a mixture of the copper powder and the tungsten powder.

In a tenth aspect according to any of the preceding paragraphs, forming the electrode can include forming an electrode having a base having a web extending from the base, wherein the web defines a matrix of cellular openings.

In an eleventh aspect according to the previous paragraph, forming the electrode can further include forming one or more internal passages in the base of the electrode.

In a twelfth aspect according to any of the preceding paragraphs, the method can include smoothing the electrode using a secondary electrode by plunge electrical discharge machining or electro-chemical machining.

In a thirteenth aspect according to the preceding paragraph, smoothing the electrode can include smoothing the electrode such that the surface roughness of the electrode is about 1 to about 50 μm.

In a fourteenth aspect, an electrode can be formed by a method according to any of the preceding paragraphs.

In a fifteenth aspect, a method for manufacturing an electrode includes forming a porous tungsten structure in a layer-by-layer manner, wherein each layer is formed by depositing a layer of a tungsten powder; and selectively fusing the tungsten powder prior to depositing a subsequent layer using a laser having a laser energy of about 1 to about 10 J/mm$^2$, and infiltrating the porous tungsten structure with molten copper so as to form an electrode comprising a porous tungsten structure infiltrated by copper.

In a sixteenth aspect according to the preceding paragraph, the porous tungsten structure can have a relative density level of at least about 75%.

In a seventeenth aspect according to either of the two preceding paragraphs, the tungsten powder can have a particle size distribution of about 15 μm to about 55 μm.

In an eighteenth aspect according to any of the three preceding paragraphs, infiltrating the porous tungsten structure with molten copper can be performed by one of spontaneous or pressure infiltration, centrifugal infiltration, ultrasound-driven or aided infiltration, or Lorenz force infiltration.

In a nineteenth aspect according to any of the four preceding paragraphs, the electrode can have a base having a web extending from the base, wherein the web defines a matrix of cellular openings.

In a twentieth aspect according to any of the five preceding paragraphs, the method can further include smoothing the electrode using a secondary electrode by plunge electrical discharge machining or electro-chemical machining.

In a twenty-first aspect, a method of forming an electrode for use in forming a honeycomb extrusion die includes forming, by an additive manufacturing process, an electrode comprising a base having a web extending from the base, wherein the web defines a matrix of cellular openings, and smoothing surfaces of the electrode using a secondary electrode having a plurality of pins, wherein the plurality of pins are shaped and arranged so as to mate with the matrix of cellular openings defined by the web of the electrode.

In a twenty-second aspect according to the preceding paragraph, forming the electrode can include forming the electrode from a powder mixture of tungsten and copper, and wherein the additive manufacturing process is laser powder bed fusion.

In a twenty-third aspect according to the preceding paragraph, the mixture of tungsten and copper can include tungsten particles and copper particles each having a particle size distribution of about 15 to about 55 microns.

In a twenty-fourth aspect according to any of the two preceding paragraphs, laser powder bed fusion can be performed using a laser energy of 1 $J/mm^2$ to 10 $J/mm^2$.

In a twenty-fifth aspect according to any of the four preceding paragraphs, forming the electrode can include forming a porous body using tungsten powder in laser powder bed fusion, and infiltrating the porous body with molten copper.

In a twenty-sixth aspect according to any of the five preceding paragraphs, forming the electrode can include forming a first zone of cellular openings having a first size, and a second zone of cellular openings having a second size that is different from the first size.

In a twenty-seventh aspect according to any of the six preceding paragraphs, forming the electrode can include forming a first zone of cellular openings having a first shape, and a second zone of cellular openings having a second shape that is different from the first shape.

In a twenty-eighth aspect according to any of the seven preceding paragraphs, forming the electrode can include forming the web such that each cellular opening of the matrix of cellular openings has a hexagonal cross sectional area.

In a twenty-ninth aspect according to any of the eight preceding paragraphs, forming the electrode can include forming the base so as to define one or more internal passages configured for circulation of a fluid used in electrical discharge machining.

In a thirtieth aspect according to any of the nine preceding paragraphs, forming the secondary electrode can include forming the secondary electrode by machining a metal blank using the electrode in pulsed salt electro-chemical machining.

In a thirty-first aspect according to the preceding paragraph, smoothing surfaces of the electrode can include machining the electrode using the secondary electrode in pulsed salt electro-chemical machining.

In a thirty-second aspect according to any of the eleven preceding paragraphs, smoothing surfaces of the electrode can include plunge electrical discharge machining.

In a thirty-third aspect according to any of the twelve preceding paragraphs, smoothing surfaces of the electrode can include wire electrical discharge machining.

In a thirty-fourth aspect according to any of the thirteen preceding paragraphs, the method can further include applying an electrically insulating coating to the electrode after smoothing surfaces of the electrode.

In a thirty-fifth aspect, an electrode can be formed by the method according to any of the fourteen preceding paragraphs.

In a thirty-sixth aspect, a method of forming an electrode for use in forming a honeycomb extrusion die by electrical discharge machining includes forming, by an additive manufacturing process, an electrode comprising a base and a web extending from the base, wherein the web defines a matrix of cellular openings and is configured to form a pattern in an extrusion die corresponding to the matrix of cellular openings, and smoothing the electrode such that a surface roughness (Ra) of the electrode is about 1 to about 50 μm.

In a thirty-seventh aspect according to the preceding paragraph, smoothing the electrode can include plunge electrical discharge machining of the electrode using a secondary electrode.

In a thirty-eighth aspect according to either of the two preceding paragraphs, smoothing the electrode can include machining the electrode using a secondary electrode in a pulsed salt electro-chemical machining process.

In a thirty-ninth aspect according to any of the three preceding paragraphs, smoothing the electrode can include smoothing the electrode such that the surface roughness of the electrode is about 1 to about 20 μm.

In a fortieth aspect, an additively manufactured electrode capable of forming a honeycomb extrusion die includes a base having one or more internal passages configured for circulation of a fluid used in electrical discharge machining, and a web extending from the base and defining a matrix of cellular openings, wherein the matrix of cellular openings comprises a first zone of cellular openings and a second zone of cellular openings, wherein the first zone of cellular openings and second zone of cellular openings differ in at least one of size and shape, and wherein the web is configured to form a pattern on an extrusion die corresponding to the matrix of cellular openings.

In a forty-first aspect, a method for manufacturing an electrode, the method includes applying laser energy to an initial layer of a forming powder comprised of a tungsten powder and a copper powder to form a fused layer of tungsten infiltrated by copper, depositing an additive layer of the forming powder onto the fused layer and applying laser energy to the additive layer to form another fused layer of tungsten infiltrated by copper which is also fused to the previously fused layer, and repeating the depositing of additive layers and respective applications of laser energy to form multiple fused layers in an interconnected network of tungsten infiltrated by copper, wherein the laser energy applied is about 1 to about 10 $J/mm^2$.

BRIEF DESCRIPTION OF THE DRAWINGS/FIGURES

DETAILED DESCRIPTION OF THE INVENTION

Figure 1:
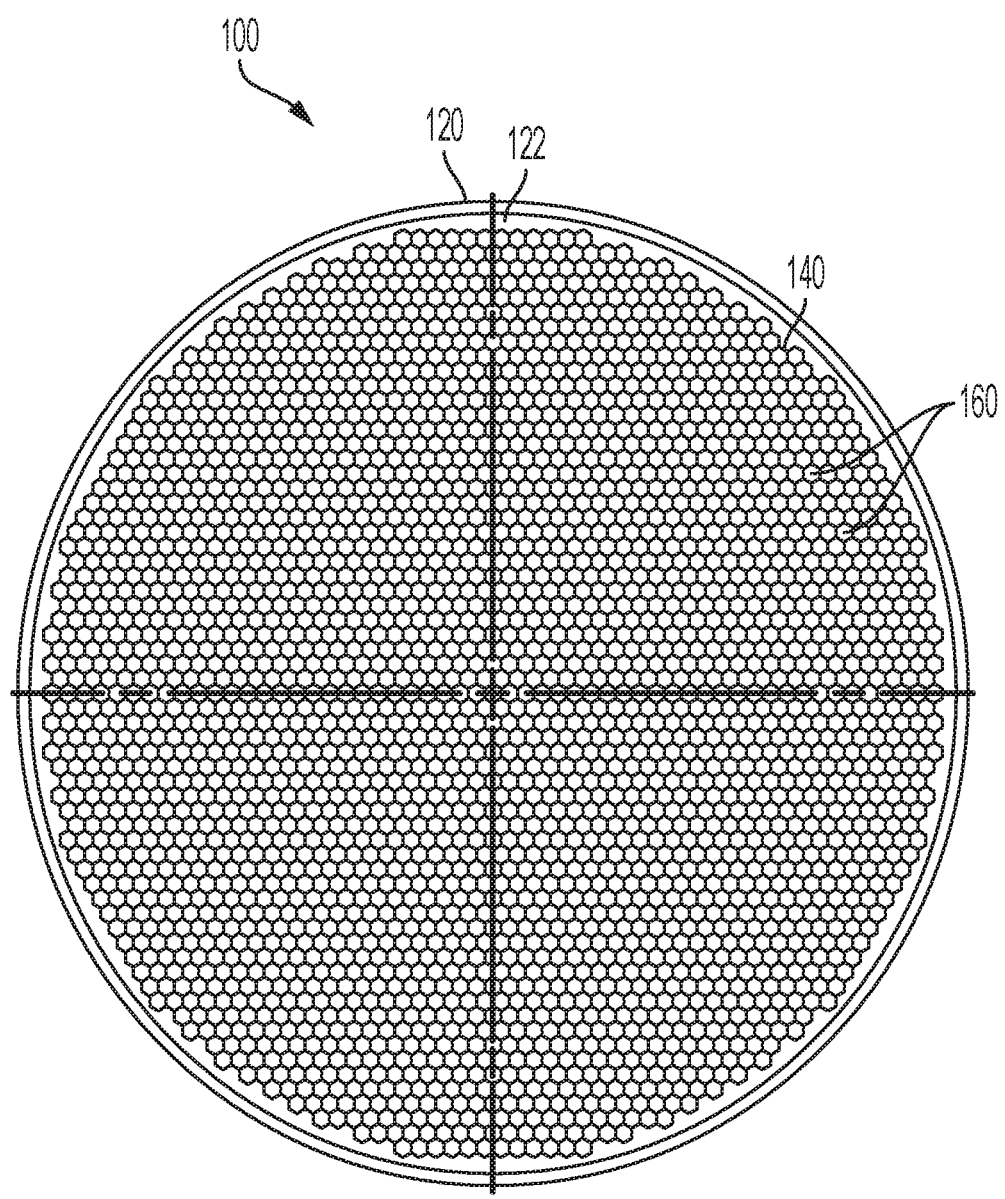
FIG. 1 is a top-down view of an electrode according to an embodiment.

The present invention(s) will now be described in detail with reference to embodiments thereof as illustrated in the accompanying drawings. References to "one embodiment," "an embodiment," "an exemplary embodiment," etc., indicate that the embodiment described may include a particular feature, structure, or characteristic, but every embodiment may not necessarily include the particular feature, structure or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In some wire EDM manufacturing processes, a linear metal (or other conductive material) wire is used to cut features such as slots or grooves into the discharge face of the extrusion die. Since the wire is linear, only linear slots can be formed on the face of the extrusion die, which limits the types of patterns and geometries that can be formed in the die face. For example, using wire EDM, it is not possible to generate a honeycomb extrusion die having a matrix of hexagonal cellular openings. The formation of extrusion dies with different zones of cellular openings that vary in size or cross sectional shape is also limited using wire EDM. However, extrusion dies having other geometries may be desired so as to form extruded articles having complex honeycomb shapes (e.g., cells that are hexagonal, circular, varied in shape/size, etc.). Such extruded articles may be used in a variety of applications, such as for the treatment of a fluid flow, such as a vehicle engine exhaust flow. With respect to vehicle engine exhaust flow, the extruded articles can be arranged as wall-flow filters having alternatingly plugged channels at inlet and outlet ends and/or as substrates for catalysts in catalytic converters. The modification of the geometry of the extruded article can be used to provide improved performance parameters, such as air flow, soot load capacity, filtration efficiency, and pressure drop, etc. under differential operational conditions.

A honeycomb extrusion die having a more complex honeycomb pattern (that cannot feasibly be manufactured by wire EDM) may be formed using plunge or "sink" EDM (referred to herein simply as "plunge EDM"). In plunge EDM, an electrode is provided that has a specific configuration for forming a honeycomb pattern in the workpiece. The workpiece is positioned in a dielectric fluid, such as an oil or deionized water. A power supply generates an electrical potential between the electrode and the workpiece. As the electrode is brought towards the workpiece, a series of electrical discharges between the electrode and the workpiece erodes the surface of the workpiece to provide the workpiece with a configuration based on the configuration of the electrode (e.g., the slots are formed as a "negative" of the pattern of the electrode).

Similarly, electrochemical machining (ECM) may be used to prepare an extrusion die having a complex geometry. In ECM, an electrical current is passed through the electrode (cathode) and a workpiece (anode). An electrolytic fluid is introduced between the electrode and the workpiece, and the electrolytic fluid transfers the charge between the electrode and workpiece. As the electrode is moved towards the workpiece, the workpiece erodes, and the eroded portion of the workpiece is carried away in the electrolytic fluid. This process continues until the workpiece has a shape that corresponds to the electrode. ECM can be performed using a continuous current or using a pulsed current (p-ECM).

While plunge EDM and ECM allow for formation of honeycomb extrusion dies with complex geometries, these processes have tradeoffs. For example, preparing an electrode may be very time consuming (e.g., by a combination of drilling, milling, wire EDM and/or other operations). Further, such subtractive manufacturing methods are not capable of being used to form an electrode having internal passages. Due to the time, cost and complexity of formation of the electrodes, it is not feasible to manufacture an electrode corresponding to the entire discharge face of the prospective extrusion die. Instead, an electrode corresponding to only a portion of the discharge face can be employed that, must be repeatedly moved to individually form each portion of the extrusion die until the full face of the extrusion die has the desired pattern. As a result, the slots in the various portions of the extrusion die, or the interface or boundary between adjacent portions, may have slight variations, asymmetries, discontinuities, and other irregularities or defects, which is undesirable.

Embodiments herein relate to methods for forming an electrode by means of an additive manufacturing technique. The additively manufactured electrode includes a base and a web defining a matrix of cellular openings, such that the electrode can be used to form a honeycomb extrusion die. The method further includes smoothing the web of the additively manufactured electrode to reduce the surface roughness of the additively manufactured electrode.

Figure 2:
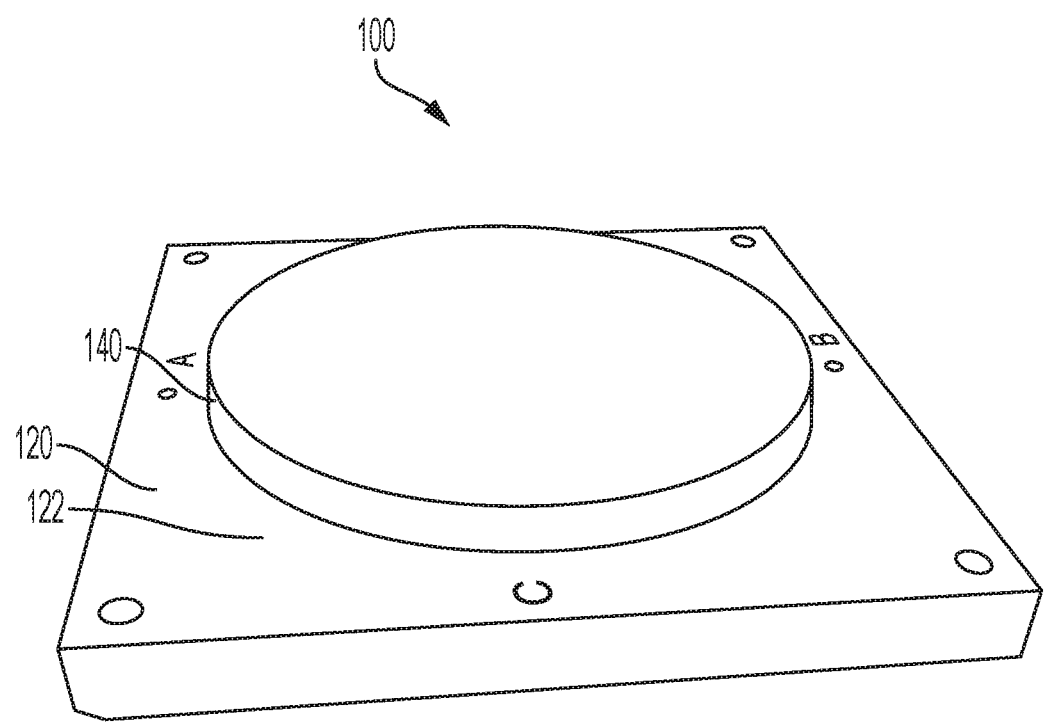
FIG. 2 is a perspective view of an electrode according to an embodiment.

An embodiment of an additively manufactured electrode 100 for forming a honeycomb extrusion die is shown for example in FIG. 1. Electrode 100 includes a base 120 and a web 140 extending from base 120. Specifically, web 140 extends from a surface 122 of base 120 and can be perpendicular to surface 122 of base 120. Base 120 can have any of various shapes such as a cylindrical block or plate, or a square or rectangular block, as shown for example at FIG. 2. Base 120 is configured to connect electrode 100 to an apparatus for performing EDM or ECM operations.

Web 140 of electrode 100 defines a matrix of cellular openings 160, as best shown in FIG. 1. When electrode 100 is used in EDM or ECM, web 140 provides the workpiece, e.g., the extrusion die, with a honeycomb pattern corresponding to the shape and configuration of web 140. As discussed herein, the additive manufacture, of electrode 100 assists in enabling the web 140 to feasibly be sized and shaped so as to form an entire face of the extrusion die at one time, greatly reducing the amount of time required to machine the extrusion die and while minimizing defects in comparison to the above-described EDM or ECM methods. The matrix of cellular openings 160 can be uniform in size and shape, such that each cellular opening 160 has the same shape and dimensions. Cellular openings 160 of web 140 can have any of various transverse cross sectional shapes, such as a triangle, a circle, an oval, a square, a rectangle, a pentagon, a hexagon, or a pie wedge, among others. In the embodiment of FIG. 1, electrode 100 is formed with a web 140 defining a matrix of cellular openings 160 each having a hexagonal transverse cross section. In some embodiments, however, web 140 defines a matrix of cellular openings 160 that is non-uniform. Thus, matrix of cellular openings 160 can include openings of different size, e.g., a matrix of cellular openings that alternate between a first size and a second size. In some embodiments, thickness of web 140 tapers towards base 120 which may help to improve distribution of fluid when electrode 100 is used in EDM or ECM. Further, thickness of web 140 can vary in different portions of web 140 in order to blend regions of web 140 having different geometries (e.g., to assist in transitioning from a cellular opening having a first size/shape to an adjacent cellular opening having a different size/shape).

Figure 3:
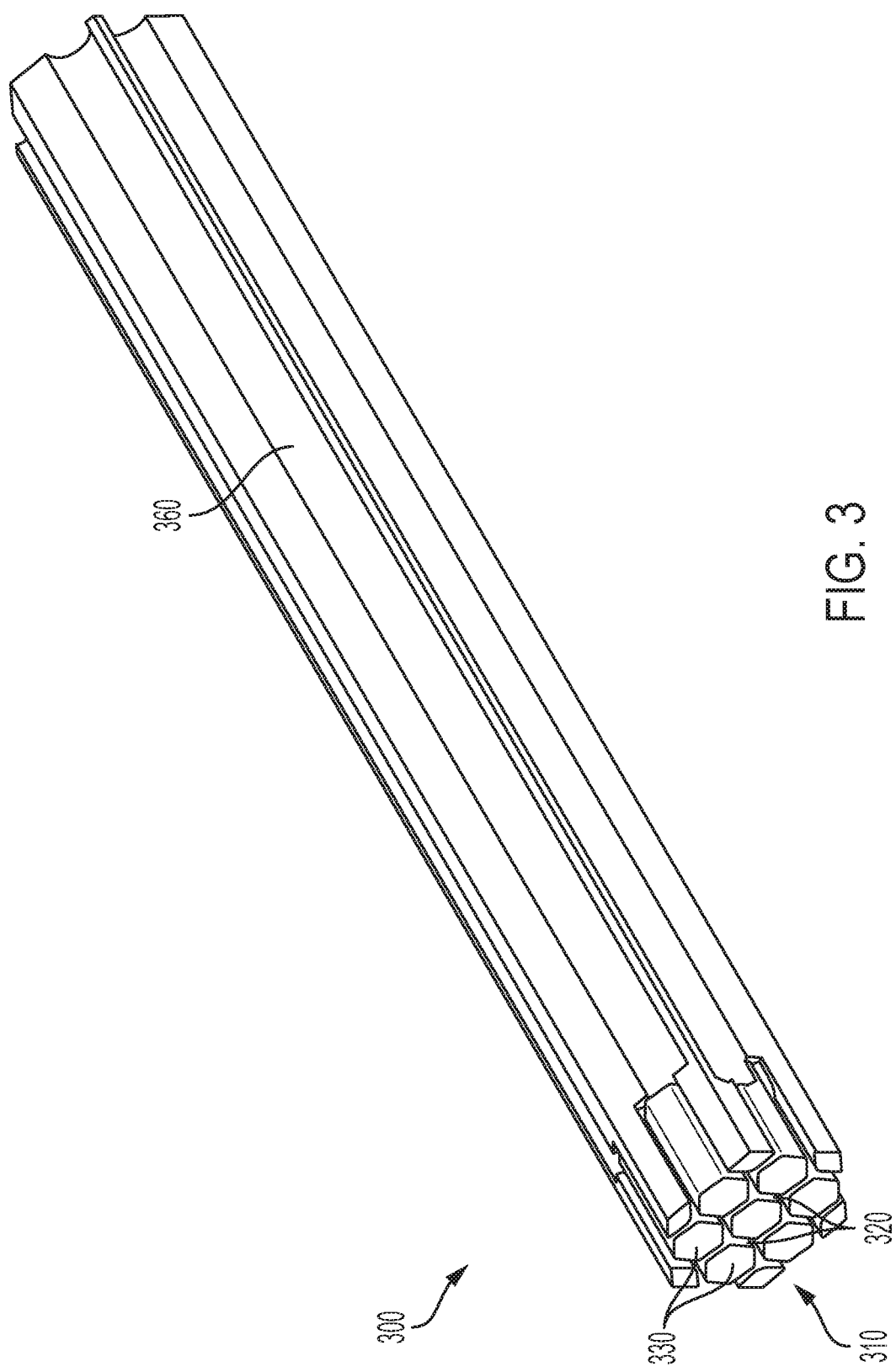
FIG. 3 is a perspective view of a portion of an extrusion die formed using an electrode according to an embodiment.

Electrode 100 is configured for use in forming a honeycomb pattern in a discharge face 310 of an extrusion die 300, a portion of which is shown in FIG. 3. The discharge face 310 comprises a plurality of pins 330 separated by a plurality of slots 320 through which an extrudable material can flow. While only a few pins 330 are shown in FIG. 3, it is to be appreciated that an extrusion die can include hundreds or even thousands of pins 330 arranged with respect to slots 320 in a desired pattern at the discharge face 310. Extrusion die 300 further includes a plurality of feed holes 360 that supply the extrudable material to slots 320 of discharge face 310, such that extrudable material flows through slots 320 and around pins 330 to produce an extruded article having a honeycomb pattern corresponding to the pattern of slots 320.

When electrode 100 is used to produce an extrusion die, such as by EDM or ECM, the honeycomb pattern of the extrusion die corresponds to the geometry of web 140 and matrix of cellular openings 160 of electrode 100. Specifically, web 140 of electrode 100 forms slots (e.g., slots 320 of extrusion die 300), and pins (e.g., pins 330 of extrusion die 300) are shaped as the cellular openings 160 of electrode 100. In this way, electrode 100 can be used to form an extrusion die with a geometry that is the inverse or negative of web 140 and cellular openings 160 of electrode 100.

As the use of additive manufacturing allows for manufacture of an electrode having complex geometries, an electrode can be formed with a plurality of zones each having different geometries and dimensions. For example, in FIG. 4, an electrode 400 is shown having a first zone 450 of cellular openings 460 and a second zone 470 of cellular openings 480. First zone 450 is annular and concentrically surrounds a circular second zone 470. In other embodiments, the zones of the electrode occupy various other shapes, sizes, or regions of the electrode. For example, a first zone can be a first half or a quadrant of the electrode and second or additional zones can occupy the opposing half or separate quadrants of the electrode. Further, in some embodiments, a first zone has a web that has a height, measured as the distance the web extends from the surface of the base in a direction perpendicular to the surface of the base, that is less than a height of the web in the second zone so as to promote uniform distribution of dielectric fluid or electrolytic fluid throughout the electrode during EDM or ECM, respectively.

Figure 4:
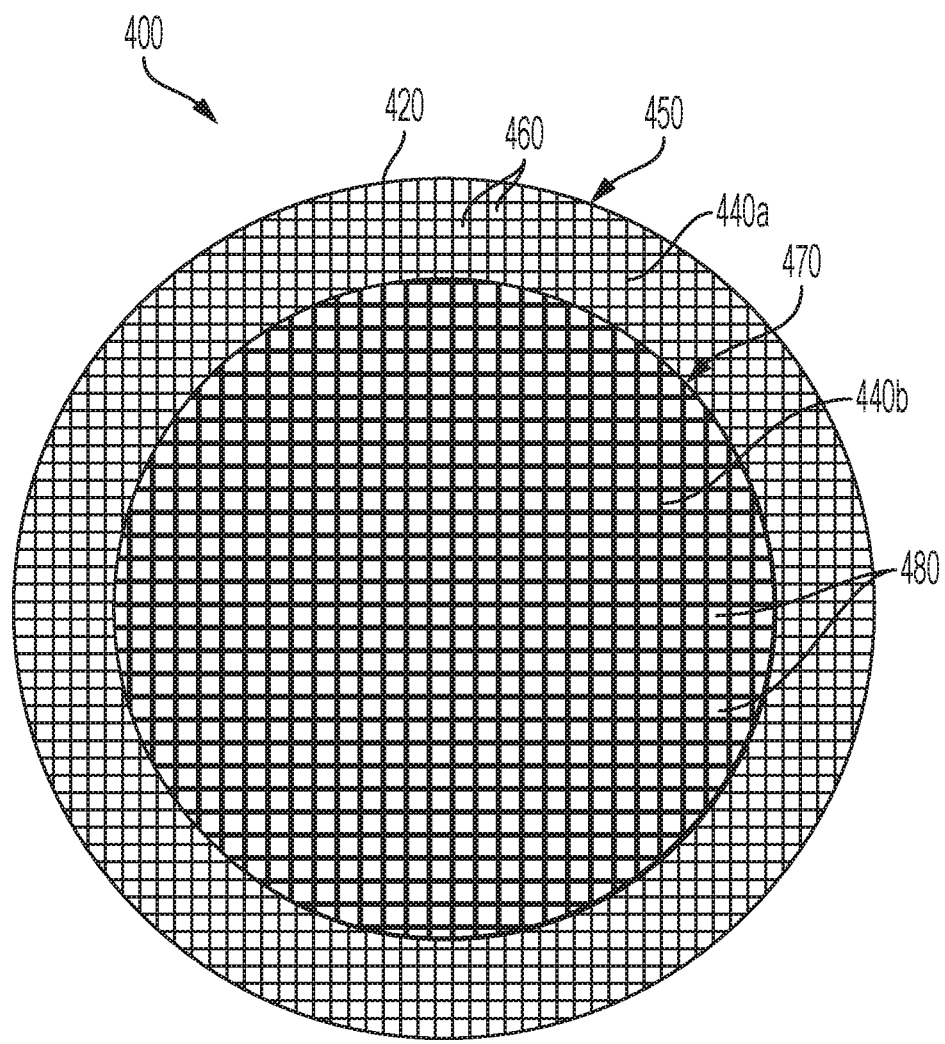
FIG. 4 is a top-down view of an electrode according to an embodiment.

In FIG. 4, first zone 450 of electrode 400 comprises a web 440a defining a matrix of cellular openings 460 comprising a first cross sectional shape and a first size or dimension. Second zone 470 comprises a web 440b defining a matrix of cellular openings 480 comprising a second cross sectional shape and a second size or dimension. Cellular openings 460, 480 of the first and second zones 450, 470 each have a square transverse cross sectional shape. However, cellular openings 460 of first zone 450 have a smaller size or dimension than cellular openings 480 of second zone 470. The size of the cellular opening refers to the transverse cross-sectional area of the cellular openings defined by the webs 440a, 440b, e.g., the area of the cellular openings 460, 480 in the plane of the view of FIG. 4. Alternatively stated, first zone 450 has a higher density of cellular openings 460 than second zone 470. In some embodiments, first zone 450 has cellular openings 460 with a cross sectional shape that differs from the cross sectional shape of cellular openings 480 of second zone 470. For example, the first zone can have cellular openings with a first cross sectional shape, e.g., a square, and the second zone can have cellular openings of a second cross sectional shape that differs from the first cross sectional shape, e.g., a triangle.

Figure 5A:
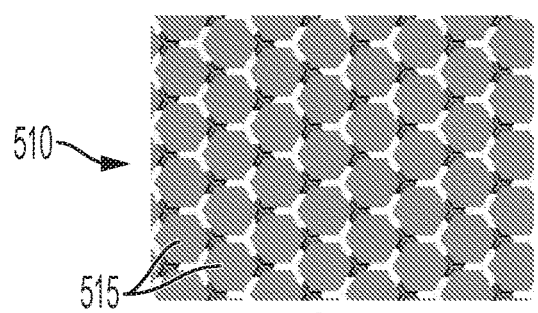
FIGS. 5A-5F are views of patterns for electrodes according to embodiments.
Figure 5B:
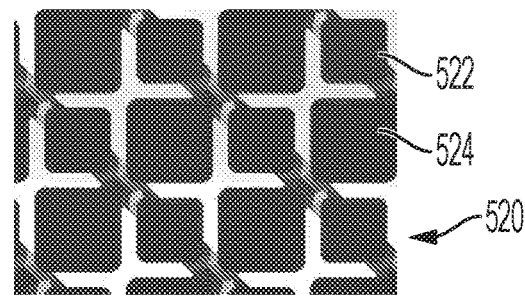
Figure 5C:
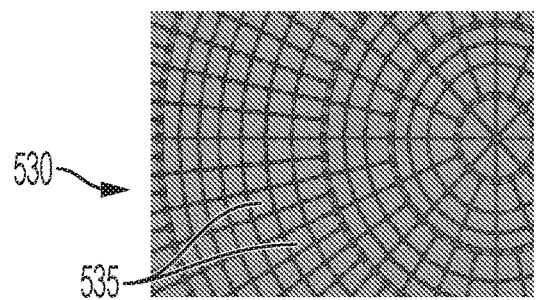
Figure 5D:
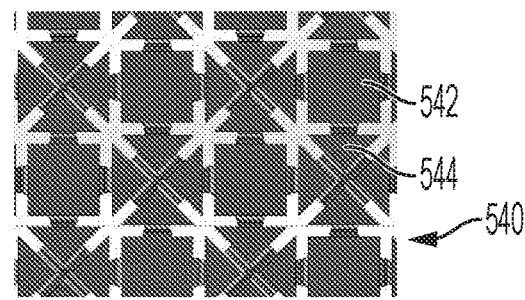
Figure 5E:
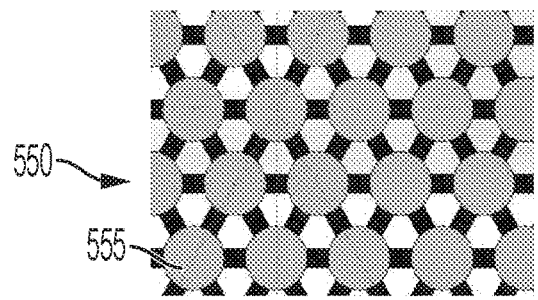
Figure 5F:
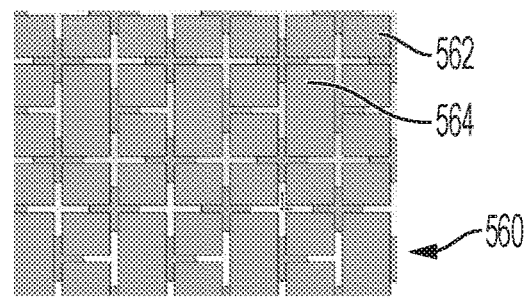

Using an electrode as described herein, an extrusion die can be formed. Various patterns of extrusion dies are shown for example in FIGS. 5A-5F. In FIG. 5A, extrusion die 510 has a plurality of hexagonal pins 515. In FIG. 5B, extrusion die 520 includes first pins 522 of a first size and second pins 524 of a second size, wherein the first size differs from the second size, and the first and second pins are arranged in an alternating pattern. In FIG. 5C, extrusion die 530 has a web-shaped pattern with wedge-shaped pins 535 defining concentric circular slots and radially extending slots. In FIG. 5D, an extrusion die 540 includes square pins 542 and triangular pins 544. In FIG. 5E, extrusion die 550 includes circular pins 555, which can be connected by ribs that provide structural support to circular pins 555. In FIG. 5F, extrusion die 560 includes a series of square pins 562 and rectangular pins 564.

Figure 6:
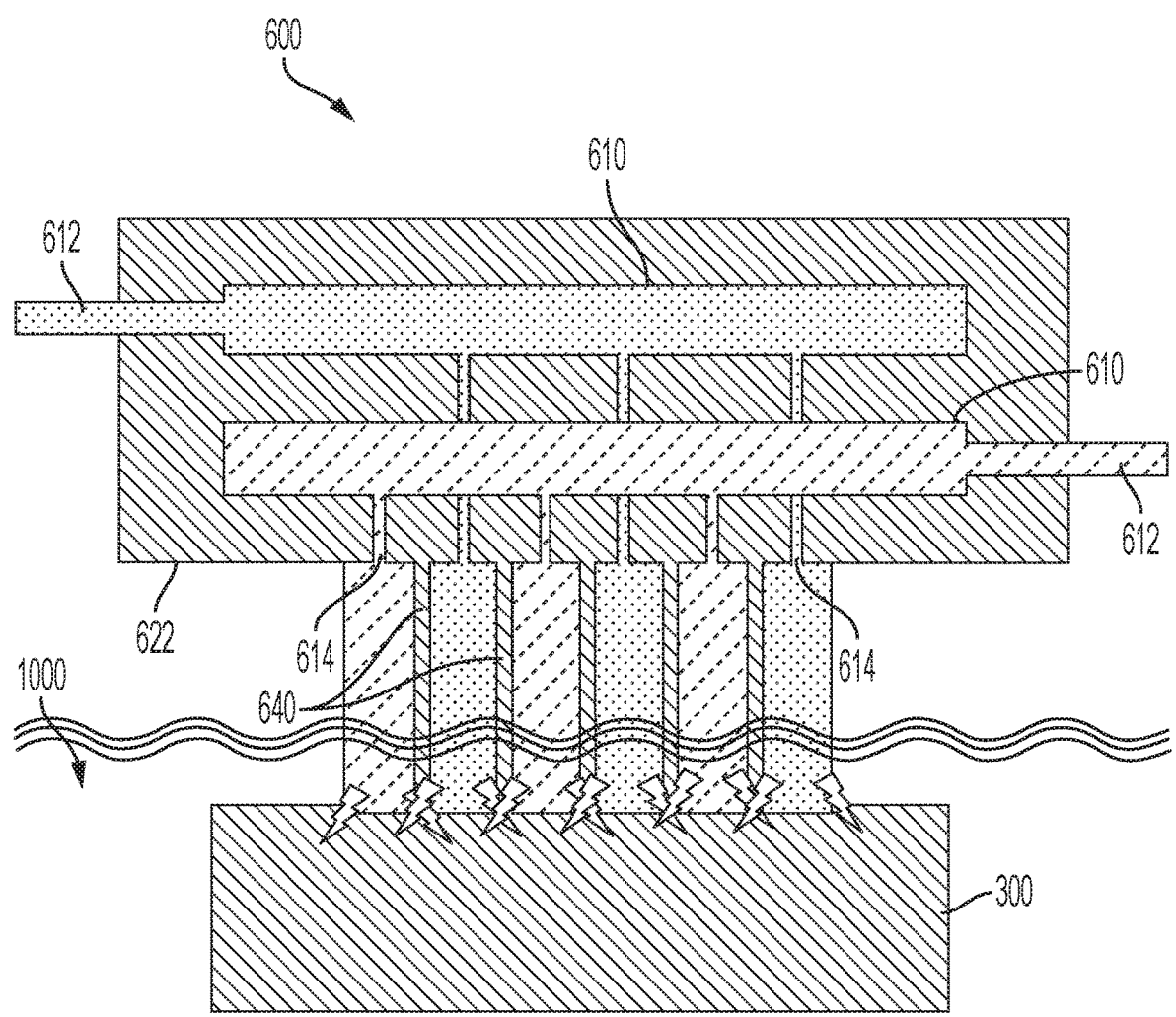
FIG. 6 is a diagram of an electrode according to an embodiment in use in an electrical discharge machining operation.

In some embodiments, electrode 600 is formed so as to have a base 620 with internal passages 610, as shown for example in FIG. 6. Using conventional wire EDM methods, an electrode having internal passages cannot readily be formed. Internal passages 610 can be useful for circulation of a fluid 1000, such as a dielectric liquid that is used in electrical discharge machining using the electrode 600. Internal passages 610 can have an inlet 612 for connection to an external device, such as a pump or vacuum source, and an outlet 614 on a surface 622 of the electrode 600 on which web 640 is positioned. Fluid 1000 can be circulated through internal passages 610 so as to flush or remove the material that has been eroded from workpiece 300 by the machining process. For example, a pump can provide dielectric fluid through an internal passage 610 to web 640 of electrode 600 so as to provide dielectric fluid to the cutting zone at which web 640 meets workpiece 300, and a vacuum source can draw used dielectric fluid and eroded material away from the cutting zone through a separate internal passage 610.

According to embodiments disclosed herein, electrode 100 having a honeycomb pattern as shown in FIG. 1 is formed by an additive manufacturing process, also referred to as a three-dimensional (3D) printing process. Additive manufacturing allows for the formation of an electrode 100 having a complex geometry that cannot be achieved using conventional, subtractive manufacturing or machining techniques for forming an electrode, such as EDM, ECM, or milling and drilling operations. Additive manufacturing also allows for more rapid production of an electrode than can be achieved using conventional subtractive techniques.

Any of various additive manufacturing processes can be used to form electrode 100, including laser or electron-beam powder bed fusion (PBF) techniques including selective laser melting (SLM), selective laser sintering (SLS), direct metal laser sintering (DMLS), and electron beam melting (EBM), powder bed-less directed energy deposition (DED) approaches, material jetting, binder jetting, and stereolithography, among other additive manufacturing techniques, and hybrid approaches combining additive manufacturing and traditional machining. Further, electrode 100 can be formed from any of various materials, including brass, bronze, copper, tungsten, nickel, rhenium, thorium, lanthanum, silver, zinc, silicon, or carbides, such as silicon carbide, brass impregnated silicon carbide, tungsten carbide, or a blend, composite, or alloy thereof, among other materials suitable for use in forming electrodes.

In some embodiments, electrode 100 is manufactured from a powder mixture of tungsten and copper. Tungsten-copper (W—Cu) mixtures are well-suited for use in forming electrodes for plunge EDM as copper is electrically conductive and tungsten provides wear-resistance and resistance to spark erosion. However, tungsten-copper can present difficulties for use in additive manufacturing processes. For example, copper and tungsten are immiscible and do not form a binary alloy system. Further, there is no temperature at which copper and tungsten are in equilibrium in the same phase, as copper is in a vapor or gaseous state when tungsten is in a liquid state due to the high melting point of tungsten. Current processes for forming a tungsten body and subsequently infiltrating the tungsten body with copper are time consuming and expensive. Further, such processes do not allow for selection of the resulting shape or geometry and instead result in a solid block of tungsten-copper which must be processed by additional shaping techniques, such as by wire-EDM, plunge EDM, and the like.

In some embodiments, electrode 100 is additively manufactured using a tungsten-copper mixture by direct additive manufacturing of a mixture of pure tungsten and copper powders, such as by a laser powder bed fusion (PBF) technique.

Laser PBF is a method for forming a three-dimensional object in a layer-by-layer fashion using thermal energy sufficient to induce fusion of one or more materials. A digital representation of the object is generated that represents the object as a series of layers or cross sections. In laser PBF, a layer of a first material, such as a metal powder, for example, tungsten powder or copper powder, among others, can be deposited on a surface of a manufacturing platform. A second material, such as a metal powder, for example, copper powder or tungsten powder, among others, can be deposited subsequently or simultaneously with the first material. The metal powders can also be deposited onto the platform as a mixture of metal powders, such as a mixture of copper and tungsten powders. The deposited materials are deposited as an unfused layer on the surface of the platform. A laser-based thermal source is then used to selectively direct energy to the layer to induce fusion of the metal powders, for example tungsten and copper powders, to form a first fused layer with the desired shape based on the digital representation. A subsequent layer of the metal powders can then be deposited on top of the first fused layer, and the subsequent layer selectively fused by the laser based on the digital representation of the object. The process of depositing layers and fusing each layer is repeated until all layers of the article are formed, thereby creating an object corresponding to the digital representation.

However, in other embodiments, alternate additive manufacturing techniques as described herein can be used. The mixture can include tungsten in about 70 to 90 weight percent, with the remainder being copper. In some embodiments, the tungsten-copper mixture can include 75 weight percent tungsten and 25 weight percent copper. One of ordinary skill in the art will appreciate that the amounts of tungsten and copper can be selected based on the desired properties for the resulting electrode.

In some embodiments, the particle size distribution of tungsten and copper particles used in the laser powder bed fusion technique is from about 15 to 55 microns. In some embodiments, the particle size distribution includes particles of 25 microns or less. Fine particle sizes (e.g., less than 25 microns) can be used so as to facilitate formation of a continuous network of tungsten in the electrode. The continuous network of tungsten is necessary to provide the resulting electrode with resistance to spark erosion.

Figure 7:
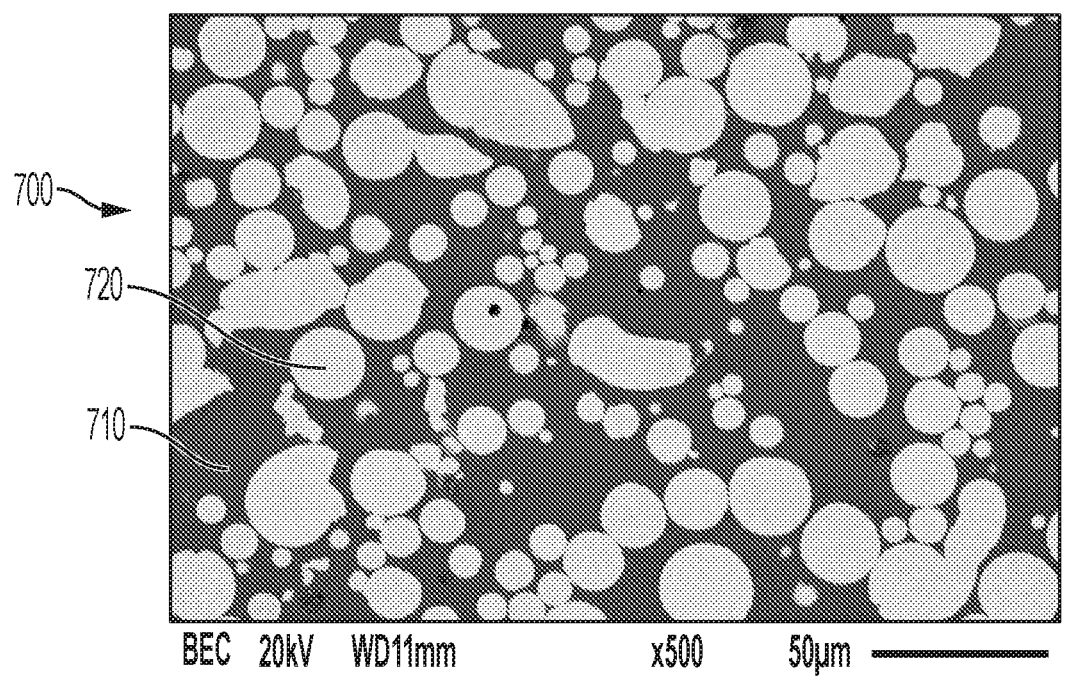
FIG. 7 is a view of a microstructure of a mixture of tungsten and copper according to an embodiment.

In direct additive manufacturing techniques discussed herein, tungsten and copper experience two processing regimes: liquid phase sintering (LPS), and tungsten melting. In LPS, molten copper rearranges non-melted tungsten particles. As a result, a mixture 700 is formed that includes isolated tungsten particles 720 dispersed in a continuous copper matrix 710, as shown in FIG. 7. Mixture 700 formed in LPS provides good electrical conductivity due to the copper matrix. However, in LPS, tungsten remains in a solid state and thus the tungsten particles do not fuse together and a continuous network of tungsten is not formed.

Figure 8:
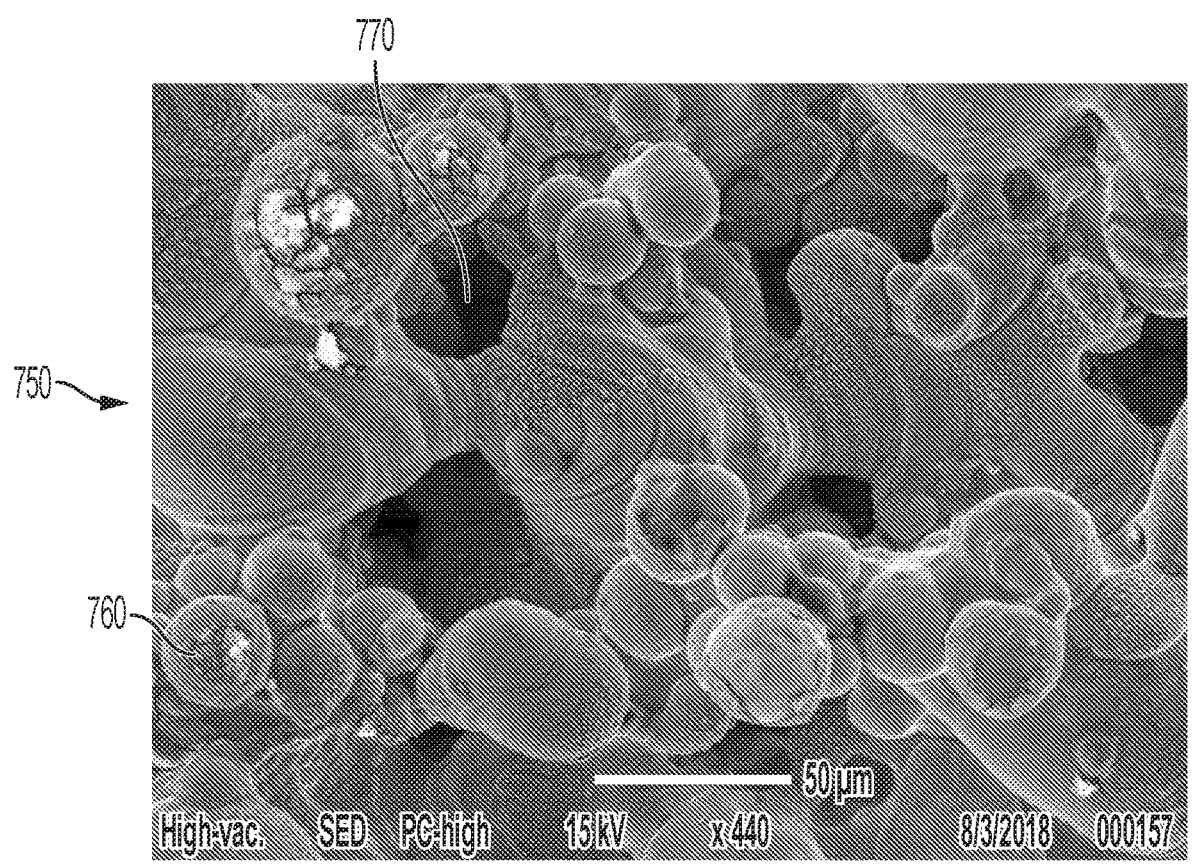
FIG. 8 is a view of an unpolished surface of a mixture of tungsten and copper having pores according to an embodiment.

In tungsten melting, tungsten melts so as to form a continuous network of tungsten which is necessary to form an electrode having wear-resistance. However, at high concentrations of tungsten, tungsten may melt and form balls 760, which result in a mixture 750 having pores 770, as shown in FIG. 8. As a result, the mixture 750 may have a lower density than a mixture formed in LPS. Thus, in order to obtain a continuous network of tungsten without a significant loss of density, it can be desirable to perform additive manufacturing using a laser energy window that allows for both LPS and tungsten melting to take place.

According to embodiments disclosed herein, a laser energy used in laser PBF can be in the range of about 1 to about 10 $J/mm^2$. In this range, a relatively dense and continuous tungsten network can be achieved. As the laser energy decreases below about 1 $J/mm^2$, tungsten melting may not occur. Conversely, at laser energies higher than about 10 $J/mm^2$, the tungsten-copper binary system experiences primarily tungsten melting.

Figure 9:
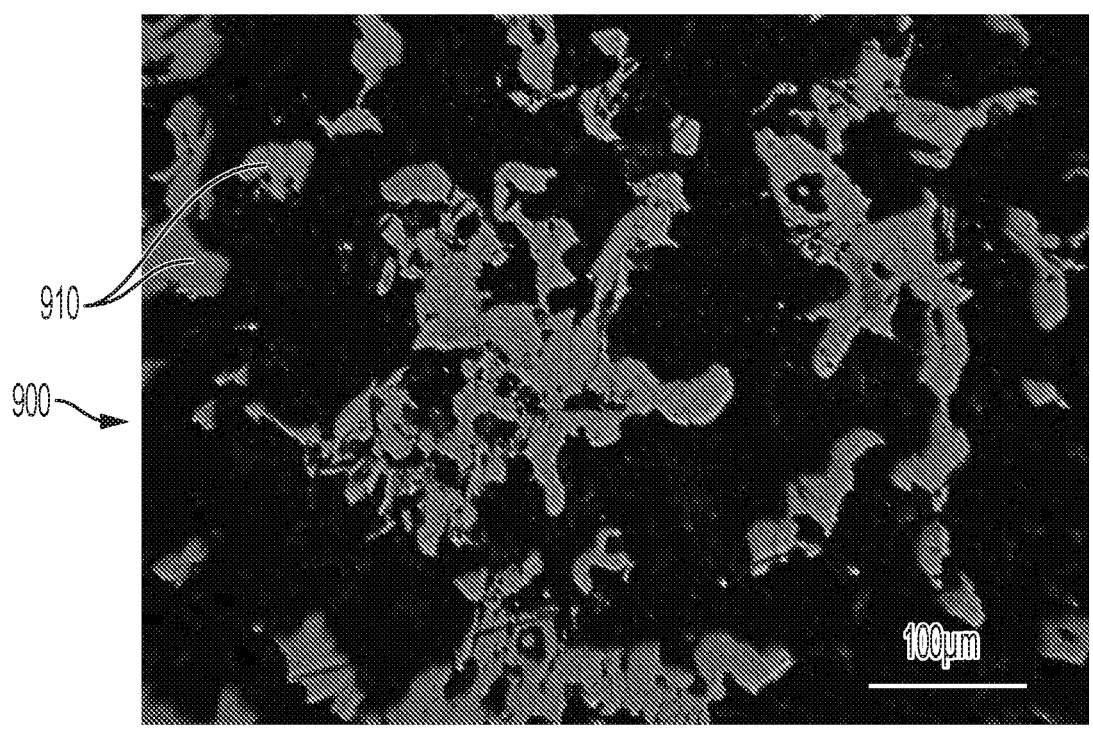
FIG. 9 is a view of a continuous tungsten matrix according to an embodiment.

In some embodiments, additive manufacturing of the electrode includes additively manufacturing a porous tungsten structure 900, as shown in FIG. 9, using tungsten powder and subsequently infiltrating the porous tungsten structure with molten copper to form the electrode. Various methods for infiltrating the porous tungsten structure with molten copper are known, including spontaneous or pressure infiltration, centrifugal infiltration, ultrasound-driven or aided infiltration, or Lorenz force infiltration. In comparison to direct additive manufacturing using a mixture of tungsten and copper powders as described above, additive manufacturing of the porous tungsten structure with subsequent copper infiltration ensures the formation of a continuous network of tungsten 910. Copper infiltration can be performed using any of various conventional methods, such by positioning the porous tungsten structure in a mold and filling the mold with molten copper. To facilitate infiltration of copper, the infiltration can be performed under pressure.

In some embodiments, a porous tungsten structure is additively manufactured using a powder bed additive manufacturing technique, such as laser PBF. The porous tungsten structure can be additively manufactured so as to provide the desired shape and configuration of the electrode, wherein the porous tungsten structure includes an interconnected network of pores. The particle size distribution of the tungsten particles can be from about 15 to about 55 microns, and can be about 25 microns or less. Further, in order to control the porosity or density of the porous tungsten structure, a range of laser energies used in laser PBF, or other similar additive manufacturing techniques can be from about 1 to 10 $J/mm^2$. It has been found by the inventors that as the laser energy increases, the relative density of the porous tungsten structure generally decreases, e.g., as result of balling of tungsten. In order to allow for subsequent copper infiltration, the resulting porous tungsten structure can be produced so as to have a relative density level of about 75%, about 80%, about 85%, about 90%, or about 95%.

Figure 10:
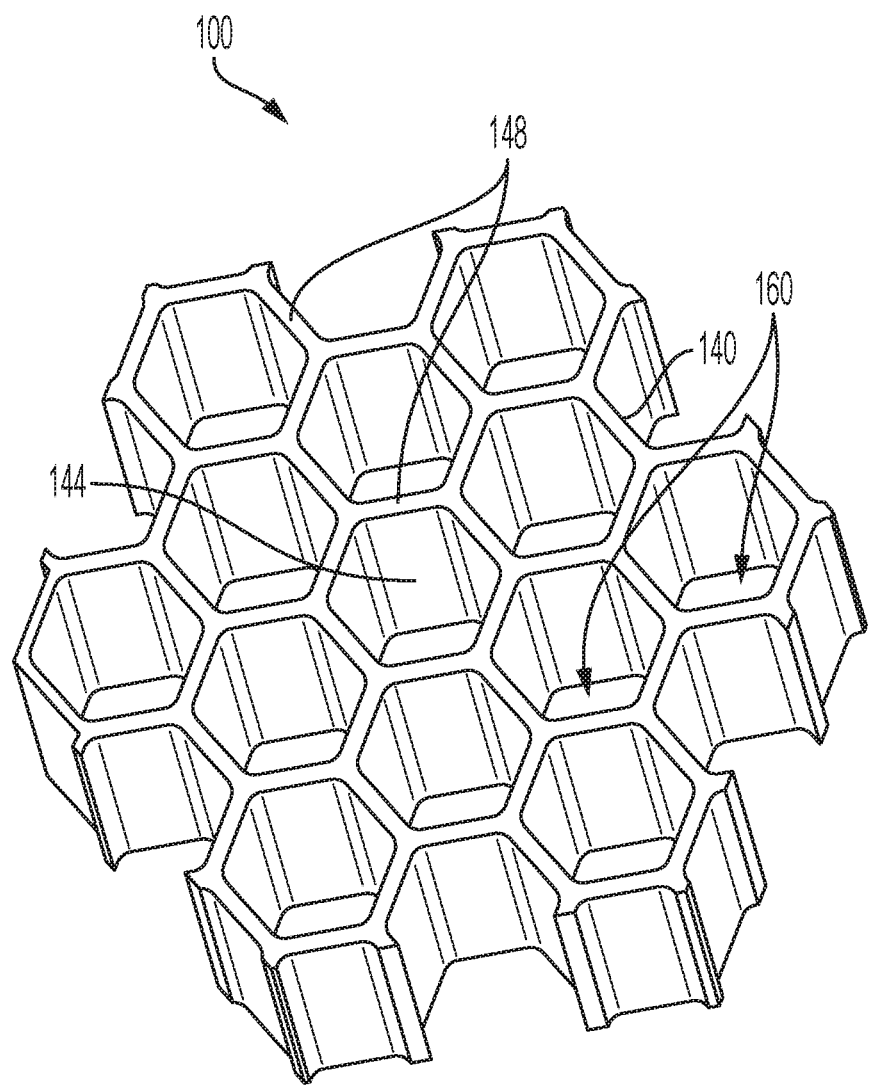
FIG. 10 is a perspective view of a portion of a web of an electrode according to an embodiment after smoothing of the electrode.
Figure 11:
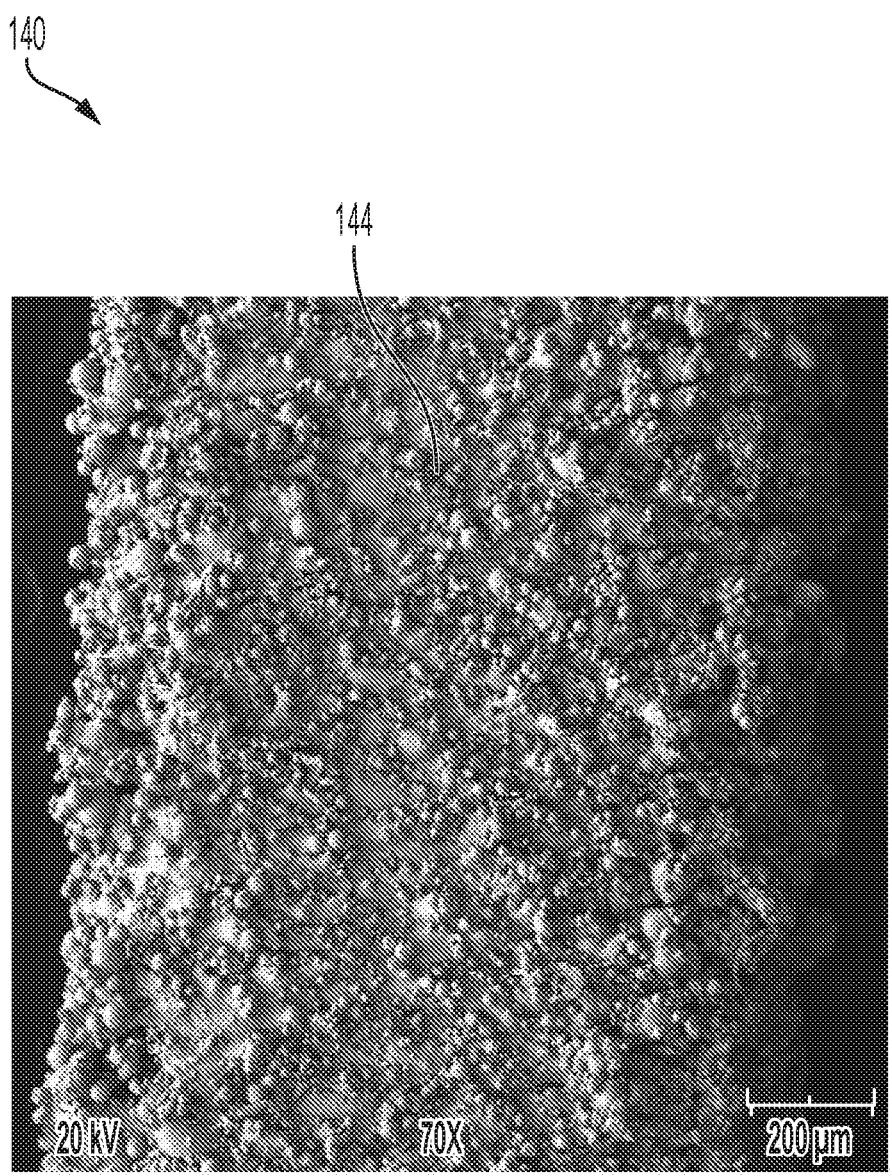
FIG. 11 is a view of a rough surface of a web of an electrode prior to smoothing.

In some embodiments, the electrodes formed by the additive manufacturing processes as described herein have a desired geometry and configuration (such as a web defining a matrix of cellular openings, and any internal passages), but also have a high surface roughness, e.g., an undesirably high surface roughness for manufacturing extrusion dies for a particular application. As used herein, the term "surface roughness" or "roughness" shall refer to the arithmetic average roughness, Ra. FIG. 10 shows a portion of a web 140 of an electrode 100 formed by additive manufacturing. Internal surfaces 144 of web 140 produced by additive manufacturing may have a surface roughness, Ra, of about 100 μm or more. A close-up of an internal surface of an additively manufactured electrode 100 having a high surface roughness is shown for example at FIG. 11. According to embodiments disclosed herein, in order for electrode 100 to be used in subsequent extrusion die manufacturing processes, electrode 100 formed by additive manufacturing is smoothed to reduce the surface roughness.

Particularly, internal surfaces 144 of the web 140, which surround cellular openings 160, can be smoothed. For example, if the surface roughness of electrode 100 is high, an extrusion die formed using the rough electrode will also have a high surface roughness. Smooth surfaces of features of the extrusion die (e.g., of the pins of the extrusion die proximate to the discharge face) can be useful to facilitate more uniform flow throughout the die and/or for extruding more dimensionally uniform articles, due to the interaction of the extrudable material flowing through the channels of the extrusion die defined between the side surfaces of the pins.

In some embodiments, additively manufactured electrode 100 is smoothed to provide web 140 with a surface roughness, Ra, of about 1 to about 50 μm, about 1 to about 40 μm, about 1 to about 30 μm, about 1 to about 20 μm, or about 1 to about 10 μm. However, other roughness values can be used in other embodiments, depending on the parameters of the extrusion process, such as the ingredients or batch mixture of the material to be extruded, the dimensions of the slots/pins in the extrusion die, among other parameters.

Electrode 100 formed by additive manufacturing can be smoothed by any of a variety of methods including plunge EDM, wire EDM, electrochemical machining (ECM), pulsed-salt electrochemical machining (p-ECM), milling, micro-machining, or a combination thereof. Specifically, the internal surfaces 144 of web 140 of electrode 100 can be smoothed by the above-listed methods. Operations for smoothing the additively manufactured electrode can be performed relatively quickly and with less expense in comparison to forming the entire electrode using EDM or ECM methods. Smoothing operations can also serve to reduce the dimensions of electrode 100, such as the thickness of the web, t1, to the desired final dimensions for electrode 100 (e.g., enabling an extrusion die to be "rough cut" with dimensions that are intentionally too thick and then smoothed to reduce the thickness).

Figure 12:
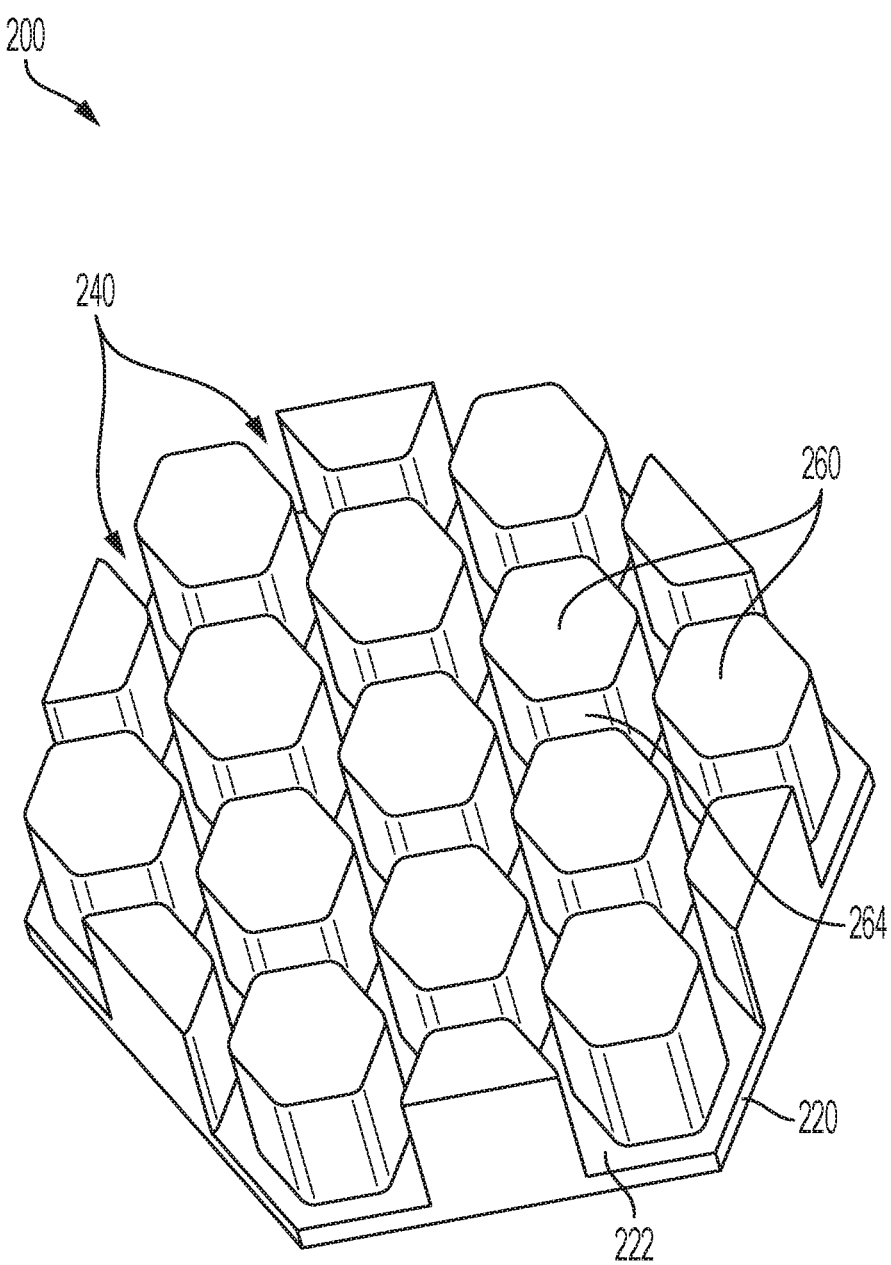
FIG. 12 is a perspective view of a secondary electrode for smoothing an electrode according to an embodiment.

In some embodiments, electrode 100 is smoothed by EDM or ECM using a secondary electrode 200, as shown for example in FIG. 12. Secondary electrode 200 includes a base 220 and a plurality of pins 260 extending from a surface 222 of base 220. Pins 260 of secondary electrode 200 are shaped and arranged so as to mate with web 140 and matrix of cellular openings 160 of electrode 100. By "mate" it is meant that pins 260 generally correspond in size and shape to cellular openings 160. For example, if electrode 100 has a matrix of cellular openings with a hexagonal cross sectional area, pins 260 of secondary electrode 200 is also formed with a hexagonal cross sectional area. Pins 260 are dimensioned so as to fit within cellular openings 160 of electrode 100 with a close tolerance so as to smooth the interior surfaces 144 of web 140. Thus, when pins 260 of secondary electrode 200 are inserted into cellular openings of electrode 100, surfaces 264 of pins 260 can be adjacent to internal surfaces 144 of web 140 of electrode 100.

Secondary electrode 200 can be formed by any of the various methods discussed herein, such as by additive manufacturing, wire EDM (depending on the desired pin shape), pulse EDM, ECM, or p-ECM. Further, secondary electrode 200 can be formed from any of various materials. Secondary electrode 200 can have a low surface roughness so as to produce an electrode with a low roughness. Secondary electrode can be relatively smooth, i.e., have a low surface roughness (e.g., in comparison to the surface roughness of electrode 100), e.g., particularly if secondary electrode 200 is to be used in a plunge EDM process for smoothing electrode 100.

Figure 13:
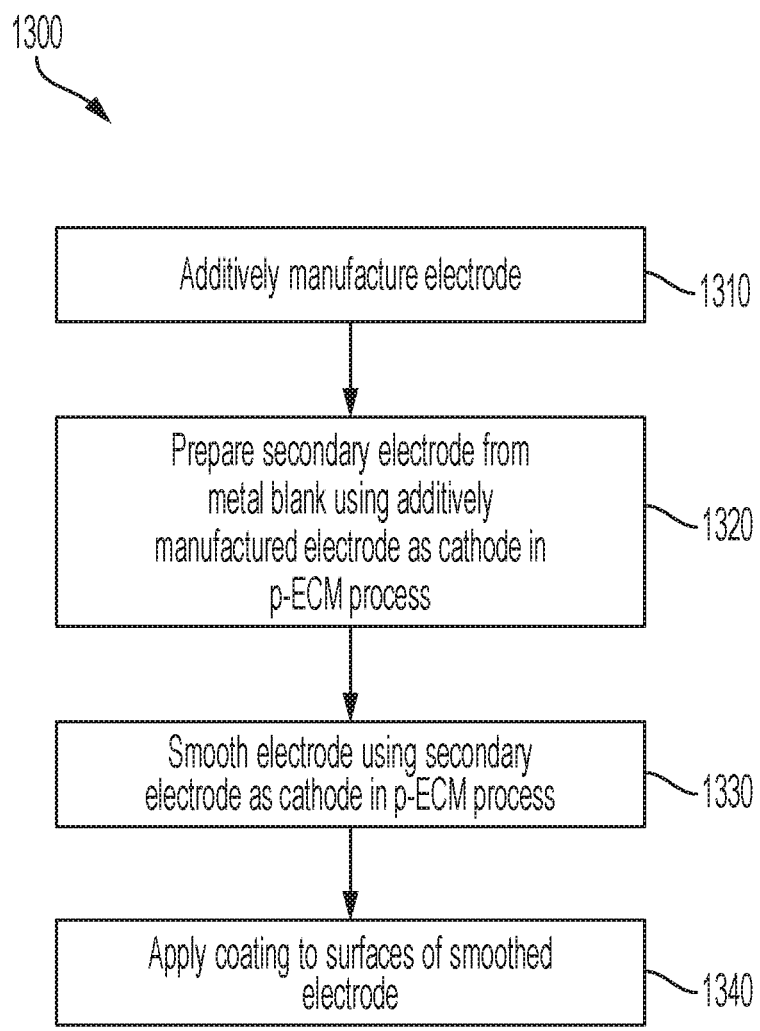
FIG. 13 is a flow chart of a method of forming an electrode for use in preparing a honeycomb extrusion die according to an embodiment.

In some embodiments, as shown in FIG. 13, a method for forming an electrode by additive manufacturing 1300 is provided. The additively manufactured electrode 1310 is used to form a secondary electrode from a metal blank, such as a stainless steel blank. In such embodiments, the additively manufactured electrode is used as the cathode in a p-ECM process to machine a honeycomb pattern into the metal blank so as to form the secondary electrode having the negative pattern of the additively manufactured electrode 1320. Secondary electrode is then used to smooth the additively manufactured electrode 1330. Electrode can be smoothed using the secondary electrode as the cathode in a p-ECM process. The secondary electrode used in p-ECM can smooth the web of the additively manufactured electrode such that the electrode has a desired surface roughness Ra within about ±0.05 μm. Smoothing the electrode using p-ECM allows for smoothing of the electrode more rapidly than conventional machining methods, such as wire EDM which requires smoothing of each cell one at a time, and using p-ECM the matrix of cellular openings can be smoothed simultaneously.

In some embodiments, a coating is applied to surfaces of the smoothed electrode 1340. In some embodiments, the coating is applied by chemical vapor deposition, physical vapor deposition, or by atomic layer deposition. The coating can also be applied by an electrostatic coating process, such as by electrostatic painting or powder coating. In electrostatic coating processes, an electric charge is used to create magnetic bonds between the paint, e.g., the coating material, and the object to be coated, e.g., the electrode. In powder coating, the coat is further baked in an oven after the coating has been applied to the substrate. In some embodiments, the coating is an electrically-insulating coating that is applied to the internal surfaces of the smoothed electrode, e.g., surfaces 144 of electrode 100 as shown in FIG. 10, so as to confine machining to the external surfaces 148 of electrode 100. In some embodiments, the coating is amorphous silicon, parylene, aluminum oxide, silicon carbide, or diamond-like carbon (DLC), among various other coatings.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

Where a range of numerical values is recited herein, comprising upper and lower values, unless otherwise stated in specific circumstances, the range is intended to include the endpoints thereof, and all integers and fractions within the range. It is not intended that the scope of the claims be limited to the specific values recited when defining a range. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. Finally, when the term "about" is used in describing a value or an end-point of a range, the disclosure should be understood to include the specific value or end-point referred to. Whether or not a numerical value or end-point of a range recites "about," the numerical value or end-point of a range is intended to include two embodiments: one modified by "about," and one not modified by "about."

As used herein, the term "about" means that amounts, sizes, ranges, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

The terms "substantial," "substantially," and variations thereof as used herein are intended to note that a described feature is equal or approximately equal to a value or description. For example, a "substantially planar" surface is intended to denote a surface that is planar or approximately planar.

The present embodiment(s) have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

It is to be understood that the phraseology or terminology used herein is for the purpose of description and not of limitation. The breadth and scope of the present disclosure should not be limited by any of the above-described exemplary embodiments, but should be defined in accordance with the following claims and their equivalents.

What is claimed is:

1. A method for additively manufacturing a copper-tungsten electrode, the method comprising:
   forming an electrode as a series of layers, wherein each layer is formed by:
      depositing a layer of powder on a manufacturing platform or a previous layer in the series, wherein the layer of powder comprises a tungsten powder and a copper powder; and
      fusing the layer of powder using a laser to apply a laser energy of about 1 to about 10 J/mm2 to the layer of powder;
   wherein the electrode is comprised of an interconnected network of tungsten infiltrated by copper formed by the series of layers fused together; and
   smoothing the electrode using a secondary electrode in a plunge electrical discharge machining process.

2. The method of claim 1, wherein the electrode has a relative density of at least about 75%.

3. The method of claim 2, wherein the electrode has a relative density of at least about 90%.

4. The method of claim 1, wherein each of the tungsten powder and the copper powder has a particle size distribution of about 15 μm to about 55 μm.

5. The method of claim 1, wherein each of the tungsten powder and the copper powder has a particle size distribution of about 25 μm or less.

6. The method of claim 1, wherein the tungsten powder is present in the layer of powder in an amount of about 70 wt. % to about 90 wt. %.

7. The method of claim 1, wherein the tungsten powder is present in the layer of powder in an amount of 75 wt. % and the copper powder is present in an amount of 25 wt. %.

8. The method of claim 1, wherein depositing the layer of powder comprises depositing one of the tungsten powder or the copper powder, and subsequently depositing the other of the tungsten powder or the copper powder.

9. The method of claim 1, wherein depositing the layer of powder comprises depositing a mixture of the copper powder and the tungsten powder.

10. The method of claim 1, wherein forming the electrode comprises forming an electrode comprising a base having a web extending from the base, wherein the web defines a matrix of cellular openings.

11. The method of claim 10, wherein forming the electrode further comprises forming one or more internal passages in the base of the electrode.

12. The method of claim 1, wherein smoothing the electrode comprises smoothing the electrode such that the surface roughness of the electrode is about 1 to about 50 μm.

13. A method for manufacturing an electrode, comprising:
   forming a porous tungsten structure in a layer-by-layer manner, wherein each layer is formed by:
      depositing a layer of a tungsten powder; and
      selectively fusing the tungsten powder prior to depositing a subsequent layer using a laser having a laser energy of about 1 to about 10 $J/mm^2$;

infiltrating the porous tungsten structure with molten copper so as to form an electrode comprising a porous tungsten structure infiltrated by copper; and smoothing the electrode using a secondary electrode in a plunge electrical discharge machining process.

14. The method of claim 13, wherein the porous tungsten structure has a relative density level of at least about 75%.

15. The method of claim 13, wherein the tungsten powder has a particle size distribution of about 15 μm to about 55 μm.

16. The method of claim 13, wherein infiltrating the porous tungsten structure with molten copper is performed by one of spontaneous or pressure infiltration, centrifugal infiltration, ultrasound-driven or aided infiltration, or Lorenz force infiltration.

17. The method of claim 13, the electrode comprises a base having a web extending from the base, wherein the web defines a matrix of cellular openings configured to form a honeycomb pattern in an extrusion die corresponding to the matrix of cellular openings.

\* \* \* \* \*

UNITED STATES PATENT AND TRADEMARK OFFICE
CERTIFICATE OF CORRECTION

PATENT NO. : 11,833,604 B2
APPLICATION NO. : 17/613822
DATED : December 5, 2023
INVENTOR(S) : Timothy Eugene Antesberger et al.

Page 1 of 1

It is certified that error appears in the above-identified patent and that said Letters Patent is hereby corrected as shown below:

In the Claims

In Column 14, Line 21, in Claim 1, delete "J/mm2" and insert -- $J/mm^2$ --.

Signed and Sealed this
Thirtieth Day of September, 2025

John A. Squires
*Director of the United States Patent and Trademark Office*